US006522998B1

(12) United States Patent
Mazur et al.

(10) Patent No.: US 6,522,998 B1
(45) Date of Patent: Feb. 18, 2003

(54) SLED TEST APPARATUS AND METHOD FOR SIMULATING PRE-IMPACT CRASH EVENT

(75) Inventors: Joseph F. Mazur, Washington, MI (US); Brian K. Blackburn, Rochester, MI (US); H. John Miller, III, Macomb Township, Macomb County, MI (US); Scott B. Gentry, Romeo, MI (US); Michel P. Rossey, Rochester, MI (US); Edward J. Burley, Troy, MI (US); Timothy W. Hill, Sterling Heights, MI (US); Kurt W. Schulz, Harper Woods, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/170,397

(22) Filed: Oct. 13, 1998

(51) Int. Cl.[7] .......................... G06G 7/48; G01M 19/00
(52) U.S. Cl. .............................. 703/8; 703/7; 73/865.3
(58) Field of Search ........................ 703/8, 7; 73/865.3

(56) References Cited

U.S. PATENT DOCUMENTS

| | | | |
|---|---|---|---|
| 3,845,665 A | * | 11/1974 | Cappetta et al. ........... 73/865.3 |
| 3,848,914 A | | 11/1974 | Wathen |
| 5,118,134 A | | 6/1992 | Mattes et al. |
| 5,330,226 A | | 7/1994 | Gentry et al. |
| 5,338,206 A | * | 8/1994 | Hupfer ........................ 434/305 |
| 5,373,749 A | | 12/1994 | Strand et al. |
| 5,483,845 A | * | 1/1996 | Stein et al. ................. 73/865.3 |
| 5,623,094 A | | 4/1997 | Song |
| 5,635,624 A | | 6/1997 | Cerny |
| 5,641,917 A | | 6/1997 | Hurite et al. |
| 5,694,320 A | | 12/1997 | Breed |
| 5,871,232 A | | 2/1999 | White |
| 5,872,321 A | * | 2/1999 | Yannaccone ............... 73/865.3 |
| 5,918,696 A | | 7/1999 | Van Voorhies |
| 5,929,348 A | * | 7/1999 | Stein et al. ................. 73/865.3 |
| 5,947,452 A | | 9/1999 | Albritton |
| 6,023,984 A | * | 2/2000 | Mazur et al. .............. 73/865.3 |
| 6,035,728 A | * | 3/2000 | Jost ........................... 73/865.3 |

FOREIGN PATENT DOCUMENTS

| | | |
|---|---|---|
| DE | 198 17 334 | 8/1999 |
| EP | 0 848 241 | 6/1998 |
| WO | WO 98 52794 | 11/1998 |

* cited by examiner

Primary Examiner—Hugh M. Jones
(74) Attorney, Agent, or Firm—Markell Seitzman (57) ABSTRACT

The present invention provides a method and device for simulating impact conditions which has a test sled 10, simulated occupant (14), and a pre-impact force-generating device. The pre-impact force-generating device can apply force directly to the simulated occupant being (14), thereby overcoming many of the cost problems associated with applying a low and long duration force directly to a test sled (10). The pre-impact force-generating device can be designed such that instead of providing a low and long duration force to a simulated occupant (14), it provides a short and high impact force to the simulated occupant (14). An impact force-generating device provides impact force directly to the sled (10) which simulates impact conditions.

16 Claims, 5 Drawing Sheets

SLED TEST APPARATUS AND METHOD FOR SIMULATING PRE-IMPACT CRASH EVENT

BACKGROUND AND SUMMARY OF THE INVENTION

The present invention relates generally to a crash testing apparatus and, more particularly, to device capable of simulating one or both of pre-impact conditions and vehicle crash conditions.

In the design of vehicles and their safety restraint systems it is desirable that the occupant sustain minimal injury during a crash event. This focus on occupant safety has resulted in the creation of various safety restraint systems and crash testing methods. As will seen from the discussion below, current testing methodologies do not account for "pre-impact" events. This is accomplished by the present invention.

Typically, before a vehicle crashes, two scenarios usually exist. Either the driver of the vehicle applies the vehicle brakes in anticipation of the crash or the vehicle collides with some smaller obstacle such as a curb before colliding into a larger object. The result of either of these two scenarios is the generation of a pre-impact force or acceleration on the vehicle occupant. This pre-impact force and the kinematics which follow cause the occupant to move from his or her pre-impact seated position to a modified position. This movement may be characterized by the occupant pivoting or sliding forward which may result in a reduction of the normal force and frictional forces acting between the occupant and the seat. This position is referred to as a "pre-impact position". This pre-impact re-positioning could place the occupant in a more vulnerable out-of-position orientation immediately prior to the actual vehicle collision. As a result, this phenomena may contribute to greater injuries sustained by the occupant.

In an attempt to understand crash conditions and test new safety designs, various methods and devices have been constructed and used to simulate a vehicle crash. One such method is sled testing. In sled testing, a sled with a crash test dummy is accelerated to simulate the actual crash pulse which would occur for a particular vehicle. Every aspect of this crash testing is designed to simulate, as close as possible, the actual conditions associated with a vehicle crash. In these prior test systems the test sled is either accelerated rearward at a level to match the deceleration of the vehicle crash (pulse) or the sled is accelerated forward and stopped at a proper deceleration level to match the vehicle crash pulse. In each of these test methodologies, the simulated occupant, that is, the crash dummy, is positioned in a predetermined static seating position relative to the seat carried by the test sled.

These previous crash testing methods, however, have not accounted for the effect of pre-impact conditions on the occupant for several reasons. For example, the operator of a moving vehicle may apply the brakes for many seconds before actual impact. To simulate this pre-impact activity the testing sled would have to be moved a great distance and be decelerated over a long period of time. The present invention is designed to overcome this drawback.

The present invention provides a method and device for simulating both pre-impact and impact conditions. The device includes a test sled, a simulated occupant, that is, a crash dummy, and a pre-impact force-generating device. The pre-impact forces are applied directly to the simulated occupant or the occupant compartment (or part thereof) rather than to the entire test sled, thereby overcoming many of the cost and logistical problems associated with applying a low-level, long-duration pre-impact force directly to a test sled. The pre-impact force-generating device can be designed such that instead of providing a low-level, long-duration force, it provides a short-duration and high-level impact force. To simulate crash conditions, a crash impact force-generating device provides an impact force directly to the sled which simulates the impact or crash event.

Additional advantages and features of the present invention will become apparent from the subsequent description and the appended claims taken in conjunction with the accompanying drawings.

BRIEF DESCRIPTION OF THE DRAWINGS

In the drawings which illustrate the best mode presently contemplated for carrying out the present invention.

DETAILED DESCRIPTION OF THE DRAWINGS

Figure 1:
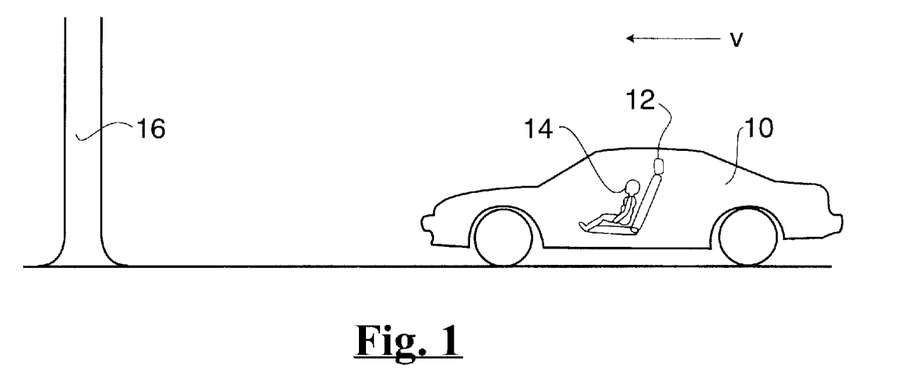
FIGS. 1 through 3 diagrammatically illustrate a typical accident event.
Figure 2:
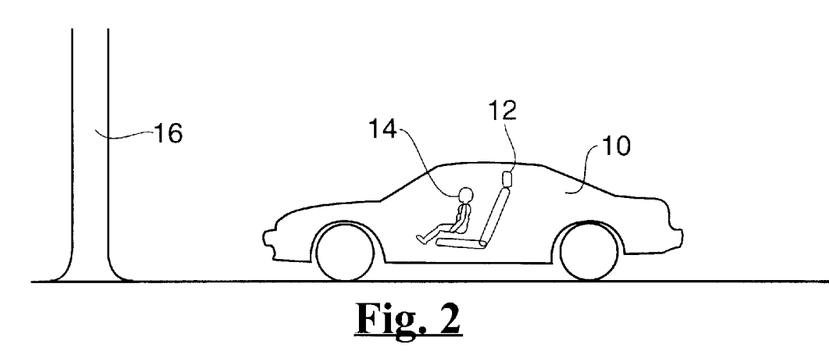
Figure 3:
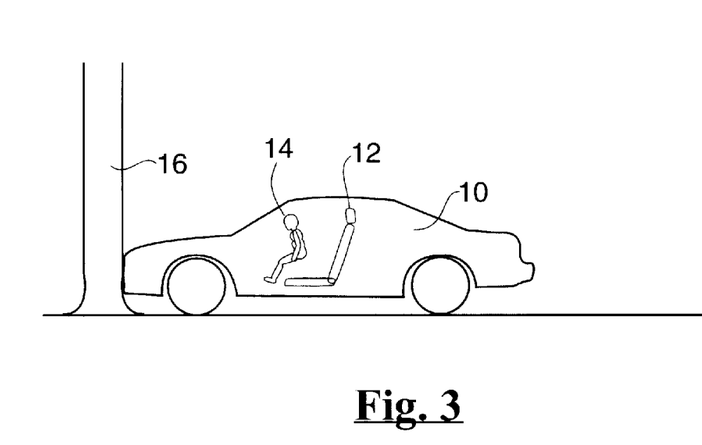

FIGS. 1, 2, and 3 show a typical vehicle 10 during various phases of an actual accident.

In FIG. 1 the vehicle 10 is shown moving forward at a velocity V.

FIG. 2 illustrates a pre-impact phase of the accident event during which the vehicle brakes are applied or perhaps the vehicle has encountered a small barrier (in trying to avoid the accident) such as a roadway curb prior to impacting another vehicle, tree, wall or other barrier 16. In response to the above, the forward velocity of the vehicle is slowed or decelerated. As the vehicle slows, the occupant 14 accelerates forwardly, relative to a seat 12 toward the front of the vehicle. As can be appreciated, the occupant will move to a "pre-impact position" relative to the seat 12 (as well as the other components within the passenger compartment). Were this deceleration high enough and the occupant not wearing his or her seat belt, the occupant could become dislodged from the seat. At a minimum this pre-impact position is characterized by a re-positioning of the occupant as well as a reduction in normal load (and frictional forces) between the seat and the occupant. In an actual crash event, this pre-impact deceleration (which may arise due to brake application or some primary impact) is in the range of approximately 0.5–1.2 g's sustained over a few seconds. This level of deceleration is considerably less than the deceleration which occurs during impact of the vehicle with a barrier. As is known in the art the actual level braking force, and corresponding deceleration, that can be generated depends upon the forces that can be generated at the tire/road interface and will vary with actual road and driving conditions.

FIG. 3 illustrates the actual crash event in which the vehicle and occupant are subjected to a much higher level of deceleration. Were the occupant 14 not restrained he could be thrown from the seat 12.

Figure 4:
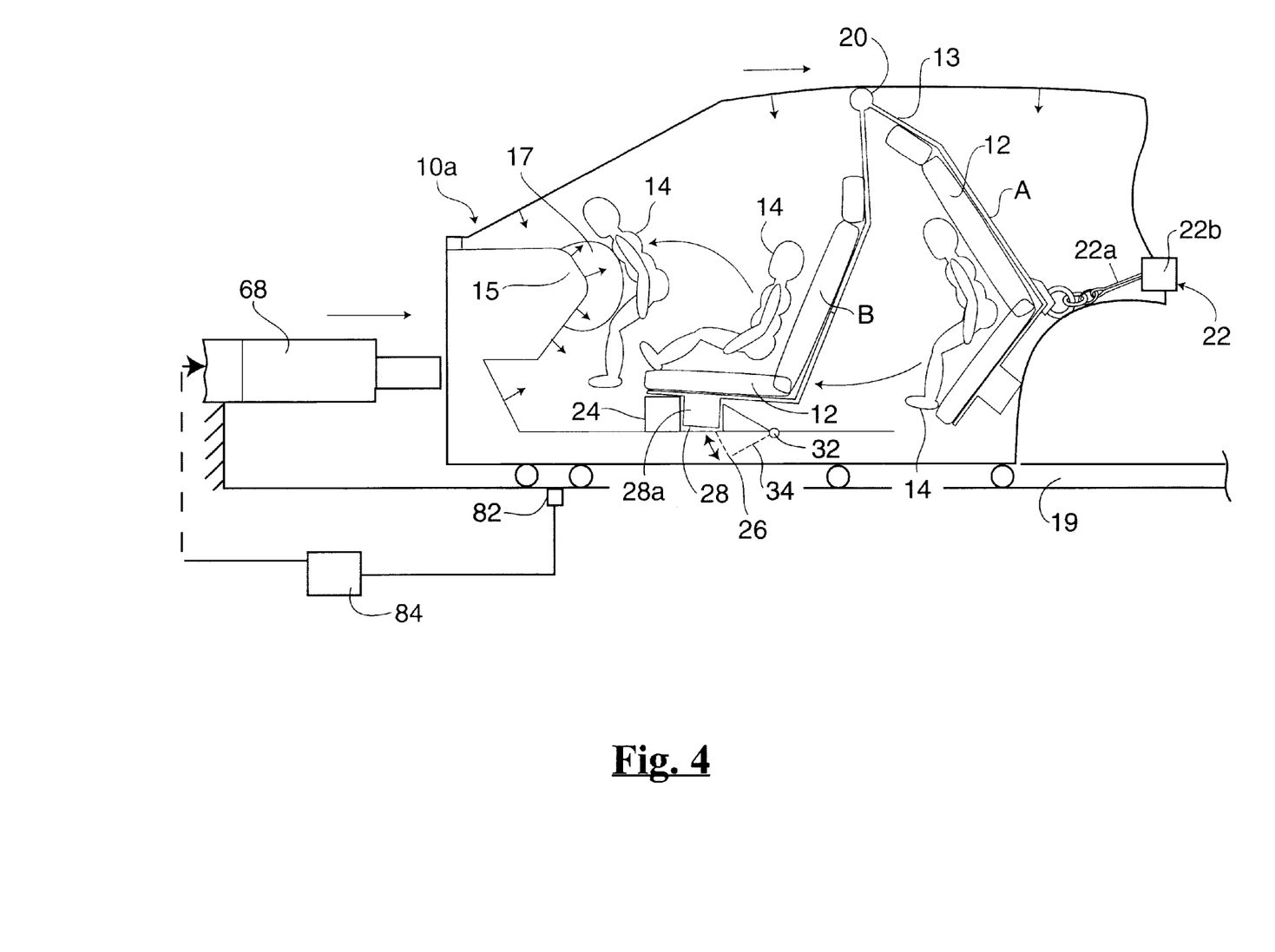
FIG. 4 is a schematic view of a pre-impact force-generating device using a pivotally mounted swinging seat according to the present invention.

FIG. 4 shows a first embodiment of the present invention used to simulate the pre-impact event. As mentioned above, during actual pre-impact conditions the vehicle may experience a deceleration of about 1 g over an extended duration. In the below-described embodiment of the invention, a simulated vehicle such as test sled 10a can held stationary (if only the pre-impact event is to be simulated) or subsequently accelerated to simulate the crash event. In the following embodiments of the invention the momentum transferred to the simulated occupant, that is dummy 14 (to simulate the actual pre-impact event) is equivalent to that achieved during the actual pre-impact event such that the dummy 14 will move at much the same pre-crash velocity as achieved in the real world. The method of simulating the pre-impact event is to preferably accelerate the dummy 14 at a higher level of acceleration (of about 2 gs) than achieved during the actual pre-impact event but for a shorter period of time, in the range of 0 to 2 seconds (most preferably about 1 second). The use of applying forces directly to accelerate the dummy overcomes the design difficulties associated with providing a long-duration force to simulate a slowing vehicle and occupant motion while still being able to position the simulated occupant 14 in a variety of the pre-impact positions without having to move the test sled over a long distance. The design of the test sled 10a permits the dummy 14 to be placed in many determinable pre-impact positions with respect to impact sled 10, such as closer to the front of impact sled 10 (i.e. to the location of frontal air bags) or closer to the rear of impact sled 10, before final impact by varying the momentum transferred. Thus, to simulate this pre-impact positioning, a small pre-impact force can be applied to dummy 14 for a lengthy period of time to move the dummy 14 closer to the front of the sled 10a. Likewise, a large pre-impact force can be applied to dummy 14 for a short time to achieve the same positioning of dummy 14. It is noted that any variation to the force and time combination can be used which places dummy 14 in its pre-impact position relative to the seat 12, and this invention is not limited to that disclosed herein. FIG. 4 illustrates an impact sled 10a which can be fabricated using a typical automobile, a section thereof or a known type of test sled buck.

The seat 12 is pivotally located on and movable with the impact sled 10a at pivot point 20. While the pivot point 20 is shown generally near to or attached to the location of the roof of the simulated vehicle, i.e. the test sled 10a, this pivot point can be located outside of the vehicle profile to provide a longer moment arm or alternately a lower pivot point location can be used. The seat 12 is secured to a cradle 13 which in turn is pivoted at 20. FIG. 4 shows the seat 12 in both a "pivoted or actuated" position A and a "released" position B. The seat 12 is maintained in position A by a release device 22 attached to the rear portion of seat 12 and/or sled. As illustrated, the release device 22 includes a cable 22a linked to a solenoid 22b. Solenoid operated release devices and their attachment are well known in the art. The seat 12 further includes a projection which serves as a mechanical seat stop 28. Extra weight 28a can optionally be added generally at the location of the stop 28 to achieve the desired terminal velocity or acceleration of the seat as it swings into position B. The sled 10a further includes a fixed mechanical stop 24 and a movable secondary stop 26 which are used to retain the seat mounted stop 28 at position B. The secondary stop 26 is pivoted about a pivot point 32 and is biased upwardly into the position shown in FIG. 4 by a spring 34. Depending upon the conditions to be simulated, the dummy 14 may be positively secured to the seat using a conventional two or three-point seat belt system which may be tightly or loosely secured about the dummy or, if unbuckled dynamic behavior is being investigated, the dummy 14 can be affixed to seat 12 by VELCRO or other attachment means which provides sufficient force to keep dummy 14 from sliding off seat 12 due to gravitational forces when seat 12 is in position A. In a related alternative embodiment of the invention the pivoted structure need not be limited to the seat 12. In this embodiment the pivoted structure would include the entire forward portion of the passenger compartment including the seat (or seats) 12 and the instrument panel.

In operation, release device 22 is activated releasing the seat 12. Upon its release, seat 12 pivots about pivot point 20 and thus moves from position A to position B permitting the seat and simulated occupant 14 to accelerate to a determinable velocity and acceleration similar to that which would be achieved during an actual pre-impact event as illustrated in FIG. 2. Seat mounted stop 28 impacts secondary stop 26, thereby depressing the secondary stop 26 against the force of spring 34. This rotates secondary stop about pivot point 32, allowing seat mounted stop 28 to contact the stop 24 rapidly halting the motion of the seat. Immediately thereafter the secondary stop 26 moves back into position trapping the seat mounted stop 28 between fixed stop 24 and movable secondary stop 26. As a result of momentum transfer, the dummy 14 is urged away from the seat 12 in the forward direction as shown and into the pre-impact position simulating the effect of the pre-impact force prior to the actual crash event as depicted in FIG. 3.

The dynamic effects of the actual crash event can also be simulated in conjunction with having first reoriented or repositioned the dummy 14 (simulated occupant) to its pre-impact position. As is known in the art test systems can be operated to simulate a crash event. There are two types of methodologies in use today. The first is generically called a deceleration sled in which a controlled piston is forcibly pushed into the front of a stationary test sled. The magnitude and speed of the impact of the piston with the test sled simulates the actual crash pulse of a particular vehicle. In the second method the test sled is propelled into a fixed barrier. This type of sled is often referred to as a bungee sled as bungee cords or other springs are used to accelerate the sled. As the construction of these testing systems is well known they will not be described in any detail. However, FIG. 4 does illustrate the first of these test methods in which a controlled piston 68 is movably disposed in front of the test sled 10a. The piston and its associated mechanisms, in general, are a shock pulse generating device. The magnitude and duration of the shock pulse can be varied in a known manner to simulate the vehicle under test and the crash conditions. Activation of the piston 68 causes the test sled 10a (which would be movably disposed upon a track 19 in a known manner) to accelerate rearwardly thereby causing the dummy to move relatively forward toward the front of the vehicle closer to the dashboard or steering wheel, both of which are diagrammatically referred to by numeral 15 to the location of an air bag 17 (located in the steering wheel or instrument panel). The above system 80 may further include a sequencing device to synchronize the movement of the sled with the operation of the piston 68. Located on or near the track 19 is a motion detector 82. One such detector 80 may include a sonic or light beam device or the detector may include a mechanical switch. The detector 82 detects movement of the front (or other area) of the test sled 10a and provides a signal of such detection to a control unit 84. The control unit 84 generates a signal to activate the piston 68. As can be appreciated the piston 68 will not move into its active position (to pulse the sled) instantaneously, especially since it may be hydraulically or pneumatically charged. The motion sensor is appropriately placed to sense the movement of the sled prior to reaching its terminal position. The control unit 84 generates a control signal in relation to the inherent delay in the activation of the piston and continued movement of the sled (toward its terminal position) so that when the piston is activated it will be in its active position as the sled is at its terminal position. In this manner the dummy will be positioned properly and the piston 68 will provide the correct crash pulse.

The operation of the entire system 80 is as follows. A control signal is sent to the solenoid device 23b releasing the seat 12. As a result of this, the dummy 14 is caused to move to its pre-impact position as described above. The piston 68 is actuated to simulate the crash event so that it can supply the crash pulse when the dummy is in its pre-impact position. Were the bungee type of test method used, the sled 10a would be accelerated towards a barrier. Prior to the impact of the sled with the barrier, the seat would be moved to place the dummy in the pre-impact position.

Figure 5:
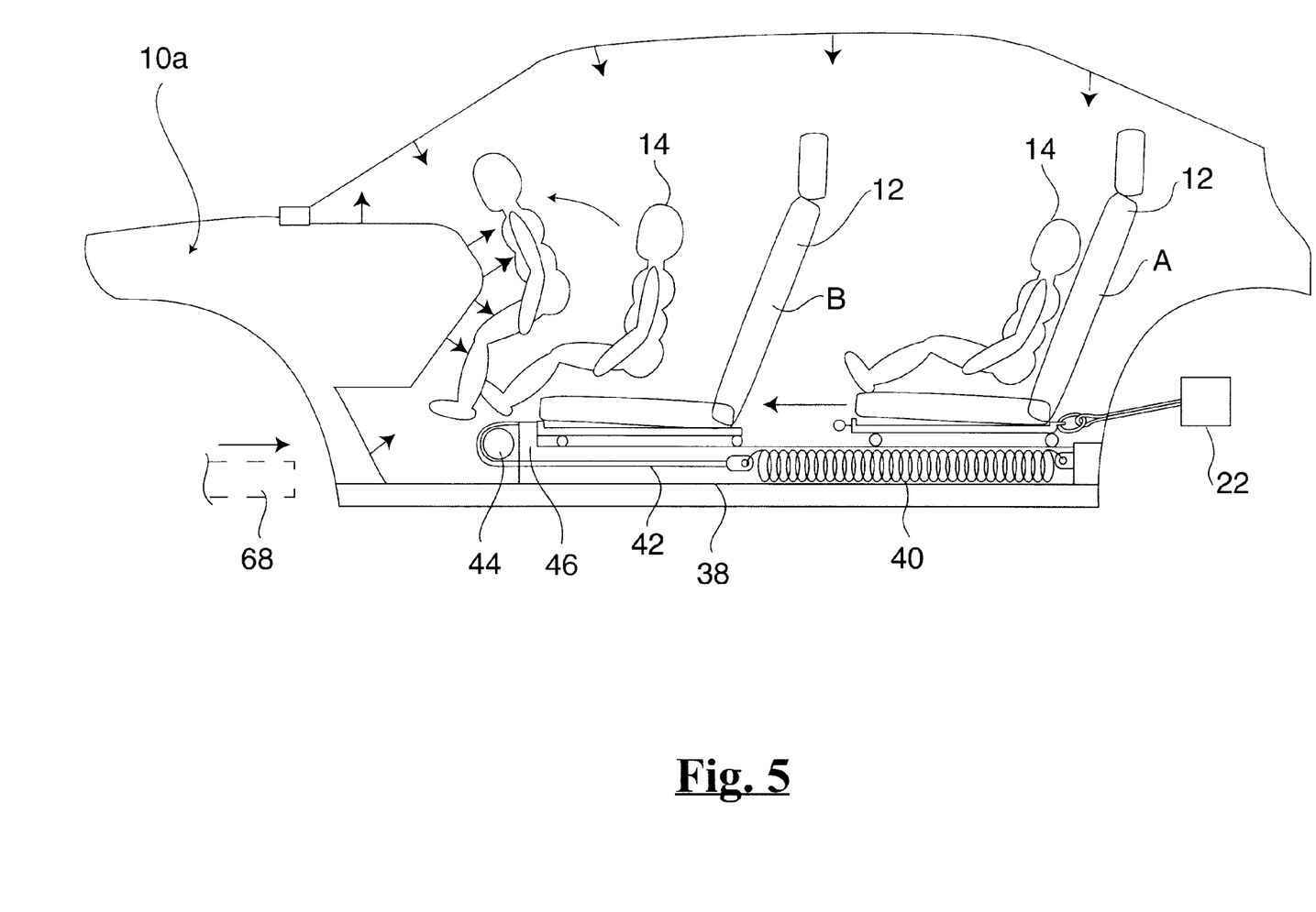
FIG. 5 is a schematic view of a pre-impact force-generating device using a track and spring-loaded cable assembly according to the present invention.

A second embodiment of the present invention is illustrated in FIG. 5 wherein the seat 12 is movably mounted upon a track 38 which is incorporated into the sled 10a. The seat 12 is slidable on the track 38 between position A and a position B. One end of a spring 40 is fixedly attached to a structural member, such as to the track 38, and another end is joined to a cable 42. Spring 40 can be any resilient device such as a bungee cord, rubber band, helical spring or any other device for applying tension. The cable 42 wraps around a roller 44 and is then attached to the front of seat 12. A release device 22 is again detachably connected to seat 12. Retraction means are provided to move the seat from its released position A to position B against the force of the spring 40. This retraction means can include manually moving the seat or alternatively a motorized winch can be used. With the seat in its position B the release device 22 is operated to hold the seat in position B.

In operation, release device 22 is activated to release seat 12 directly accelerating the dummy 14 forward to simulate the pre-impact conditions. More specifically, spring 40 draws cable 42 around roller 44 and pulls seat 12 from position A to position B. Seat 12, when in position B, impacts stop 46 which may be part of the track 38. The impact of seat 12 against stop 46 causes dummy 14 to undergo simulated pre-impact acceleration with respect to seat 12. As a result, dummy 14 is urged into a pre-impact position relative to the seat 12. A crash force generator such as piston 68 can be activated to simulate the crash event as described above. The track 19 shown in FIG. 4 has been removed for clarity.

Figure 6:
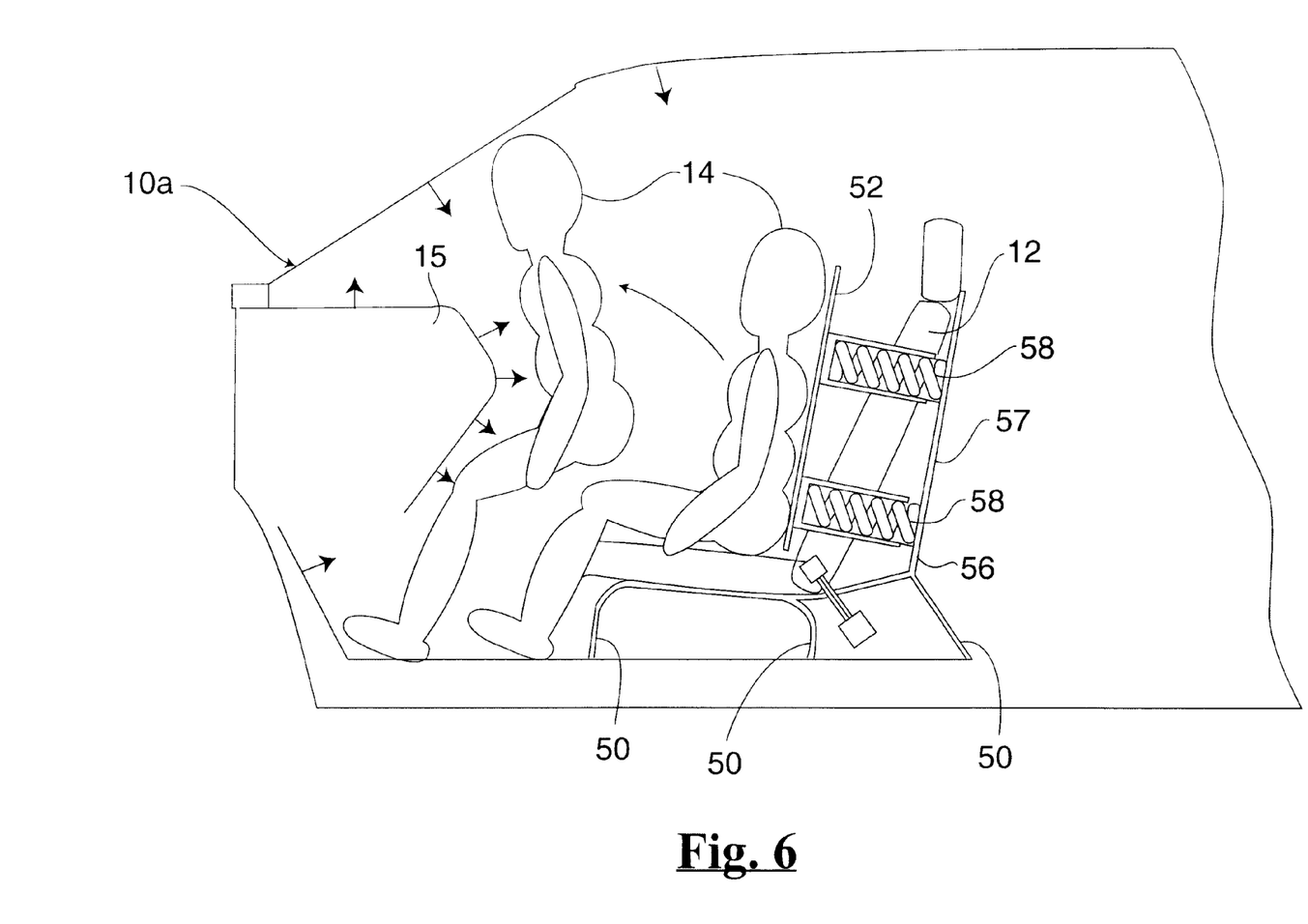
FIG. 6 is a schematic view of a pre-impact force-generating device using a series of spring-loaded pistons according to the present invention.

Referring to FIG. 6, a third embodiment of the present invention is shown which shows still another mechanism to directly accelerate the dummy 14. In FIG. 6, seat 12 is rigidly affixed to the impact sled 10a at supports 50. A fixture 56 is also rigidly attached to the sled by the supports 50. The fixture 56 includes a rear plate 57 and a movable plate or board 52. Springs 58 are supported by fixture 56 and interpose the rear plate 57 and the movable plate 52. The movable plate 52 is initially maintained in a pre-release position compressing the springs 58 by a latch mechanism (not shown). The dummy 14 is initially positioned in a sitting position adjacent to the movable plate 52. On release of a latch mechanism the springs 58 expand and accelerate the plate 52 forward. As a result, the dummy 14 is urged into a pre-impact position. Crash forces can be applied as previously mentioned.

Figures 7A, 7B:
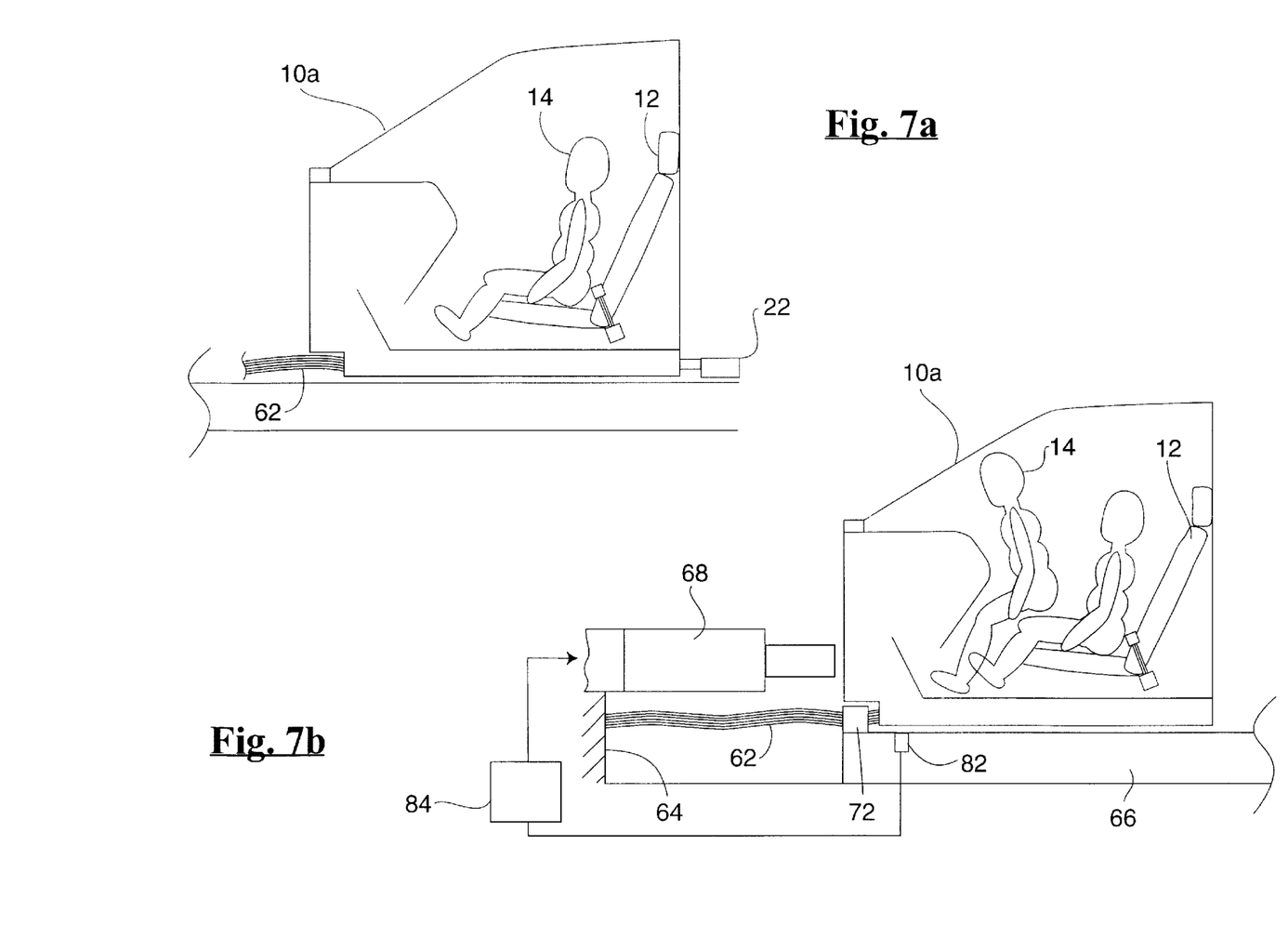
FIGS. 7a and 7b are schematic views of a pre-impact force-generating device using a bungee sled in combination with an impact generating piston simulate pre-impact and crash conditions.

Referring to FIGS. 7a and 7b, a fourth embodiment of the present invention is illustrated. Here, impact sled 10 is shown in two positions, FIGS. 7a and 7b. Release device 22 is attached to impact sled 10 as shown. A bungee cord 62 has one end fixed to an external fixed point 64 and its opposite end is fixed to impact sled 10. Impact sled 10 is slidingly engaged with track 66 by rollers or other means, allowing movement from the position in FIG. 7a to the position in FIG. 7b. Such engagement is well known in the art. A piston 68 is attached to fixed point 64 as shown.

Upon release of solenoid release device 22, impact sled 10 is pulled by bungee cord 62 from the position in FIG. 7a to the position of FIG. 7b. Block 72, which is rigidly attached to track 66, stops sled 10. Upon impact with block 72, the dummy 14 is urged forward, thereby simulating the pre-impact force and placing the dummy in its pre-impact position. Piston 68 is then actuated and impacts the front of impact sled 10, thereby accelerating impact sled 10 rearwardly. This controlled and sudden impact approximates the vehicle specific crash pulse (magnitude and time) of a particular simulated vehicle causing dummy 14 to move from its pre-impact position to an impact position.

While the above detailed description describes the preferred embodiment of the present invention, it should be understood that the present invention is susceptible to modification, variation, and alteration without deviating from the scope and fair meaning of the following claims.

What is claimed is:

1. A device for simulating impact conditions of a vehicle (10a), said device comprising:
   a simulated vehicle (10a);
   an object (14) carried by said simulated vehicle (102), said object (14) simulating a vehicle occupant;
   a pre-impact force-generating device selectively subjecting said object to a pre-impact force wherein the pre-impact force-generating device comprises a release device (22) mounted to the simulated vehicle (10a) and being detachably connected to the means for supporting the object (14), a first stop (28) mounted to the means for supporting the object (14) and having a test block stop (24) and secondary stop (26) for receiving the first stop (28) connected to the means for supporting the object (14), wherein the means for supporting the object (14) is pivotally mounted (20) relative to a surface of the simulated vehicle (102); and
   an impact force-generating device (68), said impact force-generating device (16) selectively subjecting said object to an impact force.

2. The device as claimed in claim 1, wherein said pre-impact force-generating device subjects said object (14) to said pre-impact force by providing an increased amount of force for a predetermined amount of time to said object (14) relative to an actual pre-impact breaking event.

3. The device as claimed in claim 1, wherein said pre-impact force-generating device generates said pre-impact force for a predetermined amount of time to selectively position said object (14) at a predetermined location within said vehicle (10).

4. A device for simulating impact conditions of a motor vehicle, said device comprising:
   an impact sled (10) having a seat (12), said seat (12) simulating a motor vehicle seat, said impact sled (10) being selectively movable along a path in a first direction;

a simulated vehicle occupant (14), said simulated occupant (14) being carried by said impact sled (10) by said seat (12), said impact sled (10) selectively accelerating said simulated occupant (14) to a predetermined velocity along said path;

a pre-impact force-generating device, said pre-impact force-generating device selectively exposing said simulated occupant (14) to a pre-impact force, said pre-impact force simulating a normal breaking conditions experience by a vehicle prior to a crash condition wherein the pre-impact force-generating device comprises a track (38) allowing the seat (12) to move in a forward and a rear direction with respect to the impact sled (10), a spring loaded cable (42) drawing the seat (12) in the forward direction, a release device (22) selectively releasing the seat (12) to allow the spring loaded cable (42) to draw the seat (12) in the forward direction, a second stop (46) stopping the seat (12) from moving along the track at a predetermined position; and an impact force-generating device, said impact force-generating device selectively exposing said simulated occupant figure (14) and sled to an impact force, said impact force simulating a crash force of said motor vehicle (10) in a crash condition.

5. The device as claimed in claim 4, wherein said pre-impact force-generating device selectively applies said impact force to said simulated occupant (14), said impact force simulating a crash force of said motor vehicle (10) in a crash condition.

6. The device as claimed in claim 4, wherein said pre-impact force-generating device comprises:

said seat (12) pivotally mounted (20) relative to a surface of said impact sled (10);

a release device (22) mounted to said impact sled 10 and being detachably connected to said seat (12); and a seat mounted stop (28) mounted to said seat (12) and having a test block stop (24) and secondary stop (26) for receiving said seat mounted stop 28 connected to said seat (12).

7. The device as claimed in claim 4, wherein said pre-impact force-generating device comprises:

a track (38) allowing said seat (12) to move in a forward and a rear direction with respect to said impact sled (10);

a spring loaded cable (42) drawing said seat (12) in said forward direction;

a release device (22) selectively releasing said seat (12) to allow said spring loaded cable (42) to draw said seat (12) in said forward direction; and a seat stop (46) stopping said seat from moving along said track at a predetermined position.

8. The device as claimed in claim 4, wherein said pre-impact force-generating device comprises an impact sled stop (16) located along said path, said impact sled (10) selectively impacting said impact sled stop (16) to generate said pre-impact force.

9. The device as claimed in claim 4, further comprising an impact force-generating piston (68) selectively exposing said impact sled (10) to an impact force, said impact force-generating piston (68) accelerating said impact sled (10) after said impact sled (10) impacts an impact sled stop (72).

10. The device as claimed in claim 4, wherein said pre-impact force-generating device comprises at least one spring loaded piston (58), said spring loaded piston (58) being attached to said seat (12), said spring loaded piston (58) selectively applying said pre-impact force to said simulated human (14).

11. The device as claimed in claim 4, wherein said pre-impact force-generating device generates a predetermined amount of pre-impact force for a predetermined amount of time to selectively position said simulated human at a predetermined location within said impact sled.

12. A device for simulating impact conditions of a motor vehicle, the device comprising:

an impact sled (10) having a means for supporting the occupant (12), the impact sled (10) being selectively movable along a path in a first direction;

a simulated occupant (14), the simulated occupant (14) being carried by the impact sled (10) by a means for supporting the occupant (12), the impact sled (10) selectively accelerating the simulated occupant (14) to a predetermined velocity along the path;

a means for generating a pre-impact force which selectively exposes the simulated occupant (14) to a pre-impact force, the pre-impact force simulating a normal breaking conditions experience by a vehicle prior to a crash condition;

an impact force-generating device, the impact force-generating device selectively exposing the simulated occupant (14) and sled to an impact force, the impact force simulating a crash force of the motor vehicle (10) in a crash condition, the impact generating device comprising a release device (22) mounted to the impact sled (10) and being detachably connected to the means for supporting the occupant (12), a first stop (28) mounted to the means for supporting the occupant (12) and having a test block stop (24) and secondary stop (26) for receiving the first stop (28) connected to the means for supporting the occupant (12), and wherein the means for supporting the occupant (12) is pivotally mounted (20) relative to a surface of the impact sled (10).

13. The device as claimed in claim 12, wherein the means for generating a pre-impact force selectively applies a non-crash vehicle deceleration pre-impact force to the simulated occupant (14).

14. The device as claimed in claim 12, wherein the pre-impact force-generating device comprises a means for selectively impacting an impact sled stop (16) to generate the pre-impact force.

15. The device as claimed in claim 12, wherein the means for generating a pre-impact force comprises at least one means for generating a pre-impact force (58) which is attached to the means for supporting the occupant (12), the means for generating a pre-impact force (58) selectively applying the pre-impact force to the simulated occupant (14).

16. A device for simulating impact conditions of a motor vehicle, the device comprising:

an impact sled (10) having a means for supporting the occupant (12), the impact sled (10) being selectively movable along a path in a first direction;

a simulated occupant (14), the simulated occupant (14) being carried by the impact sled (10) by a means for supporting the occupant (12), the impact sled (10) selectively accelerating the simulated occupant (14) to a predetermined velocity along the path;

a means for generating a pre-impact force which selectively exposes the simulated occupant (14) to a pre-impact force, the pre-impact force simulating a normal breaking conditions experience by a vehicle prior to a crash condition the means for generating a pre-impact force comprising a track (38) allowing the means for supporting the occupant (12) to move in a forward and a rear direction with respect to the impact sled (10), a spring loaded cable (42) drawing the means for supporting the occupant (12) in the forward direction, a release device (22) selectively releasing the means for supporting the occupant (12) to allow the spring loaded cable (42) to draw the means for supporting the occupant (12) in the forward direction, a second stop (46) stopping the means for supporting the occupant (12) from moving along the track at a predetermined position; and an impact force-generating device, the impact force-generating device selectively exposing the simulated occupant (14) and sled to an impact force, the impact force simulating a crash force of the motor vehicle (10) in a crash condition.

\* \* \* \* \*